United States Patent Office 3,312,659
Patented Apr. 4, 1967

3,312,659
CATALYTIC PREPARATION OF POLYCARBONATES FROM BISPHENOL AND A CARBONATE PRECURSOR
Raymond P. Kurkjy, Geneva, Switzerland, and Markus Matzner, Edison Township, and Robert J. Cotter, New Brunswick, N.J., assignors to Union Carbide Corporation, a corporation of New York
No Drawing. Filed July 3, 1962, Ser. No. 208,184
11 Claims. (Cl. 260—47)

The present invention relates in general to a novel process for preparing polycarbonate resins, and more particularly to an anhydrous process for preparing polycarbonates from aryl dichloroformates using metal salt reagents.

It has formerly been proposed to prepare polycarbonates by several techniques, most if not all of which can be categorized as being either ester interchange or direct phosgenation. According to the ester-interchange method a suitable diester of carbonic acid is contacted with a dihydric phenol at elevated temperatures sufficient to promote a condensation reaction and thereby form a polycarbonate chain. The direct phosgenation method comprises an inter-facial reaction between phosgene and an alkali metal salt of a dihydric phenol in a two-phase reaction system having an inert organic solvent medium for one phase and an aqueous medium for the other phase.

Each of the above-mentioned general processes has one or more disadvantages which would be desirably avoided, particularly where large scale commercial operations are involved. For example in the latter polymerization stages of the ester-exchange process, the reaction system becomes extremely viscous, thereby giving rise to problems of agitation or stirring and to problems associated with the removal from the reaction system of the reaction by-products. Also, because of the relatively high reaction temperatures involved, some molecular rearrangement is incurred which to some degree destroys the complete linearity of the polycarbonate products.

By the interfacial direct phosgenation method it has been found that a few but quite interesting dihydric phenols are polymerized to form polycarbonates only with considerable difficulty. Moreover, because of the strongly alkaline nature of the reaction system, chain cleavage of some polymer chains already formed occurs, rendering reproducibility difficult to obtain without particular effort being made to control the pH of the reaction system.

It is therefore the general object of the present invention to provide a novel anhydrous process for preparing polycarbonate resins which avoids the disadvantages of the prior known methods.

It is a more particular object of the present invention to provide a process for preparing polycarbonates in excellent yield, good color, and reproducibly high molecular weight.

These and other and more particular objects which will be obvious from the specification hereinafter are accomplished by the process of the present invention which comprises heating at elevated temperatures an anhydrous reaction system comprising a dihydric phenol, a carbonate precursor selected from the group consisting of phosgene and an aryl dichloroformate, and a catalytic amount of a non-amphoteric metal catalyst.

The dihydric phenols suitably employed include the entire class of such compounds heretofore utilized in the preparation of polycarbonate resins by prior known conventional methods. In general such dihydric phenols are usually defined as being a mononuclear or polynuclear phenol in which the two hydroxyl groups are directly attached to different nuclear carbon atoms of the same or different aromatic nucleus. The class of suitable dihydric phenols is quite large and includes those compounds described in U.S. Patent 2,950,266—Goldblum and U.S. Patent 2,964,797—Peilstöcker et al. which correspond to the general formula (I) 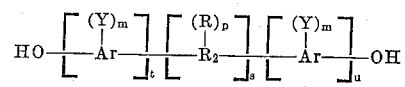

wherein R is hydrogen or a monovalent hydrocarbon radical, for example, alkyl radicals (e.g., methyl, ethyl, propyl, isopropyl, butyl, decyl, etc.), aryl radicals (e.g. phenyl, naphthyl, biphenyl, tolyl, xylyl, etc.), aralkyl radicals (e.g. benzyl, ethylphenyl, etc.), cycloaliphatic radicals (e.g. cyclopentyl, cyclohexyl, etc.) as well as monovalent hydrocarbon radicals containing inert substituents therein, such as halogen (chlorine, bromine, fluorine, etc.). It will be understood that where more than one R is used, they may be the same or different. $R_2$ is selected from the group consisting of an alkylene and alkylidene residue such as methylene, ethylene, propylene, propylidene, isopropylidene, butylene, butylidene, amylene, isamylene, isoamylidene, cyclohexylidene, etc. $R_2$ can also be a silane radical or can be a polyoxy such as polyethoxy, polypropoxy, polythioethoxy, polybutoxy, polyphenylethoxy or polyorganosiloxy, for example, polydimethyl siloxane, polydiphenylsiloxy, polymethylphenyl siloxy, etc., or and ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. Ar is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers, preferably 1. When $s$ is zero, however, either $t$ or $u$ may be zero and not both.

In the dihydric phenol compound, the substituent Y may be the same or different, as may be the R. Among the substituents represented by Y are halogen (e.g. chlorine, bromine, fluorine, etc) or oxy radicals of the formula OZ, where Z is a monovalent hydrocarbon radical similar to R, or monovalent hydrocarbon radicals of the type represented by R. Other inert substituents such as a nitro group can be represented by Y. Where $s$ is zero in Formula I, the aromatic nuclei are directly joined with no intervening alkylene or alkylidene or other bridge. The positions of the hydroxyl groups and Y on the aromatic nuclear residues Ar can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxy group. Examples of dihydric phenol compounds that may be employed in this invention include 2,2-bis-(4-hydroxyphenyl)-propane (Bisphenol-A);
2,4'-dihydroxydiphenyl-methane;
bis-(2-hydroxyphenyl)-methane;
bis-(4-hydroxyphenyl)-methane;
bis-(4-hydroxy-5-nitrophenyl)-methane ;

bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl) propane;
2,2-bis-(4-hydroxyphenyl)-1-phenyl propane;

and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones such as bis-(p-hydroxyphenyl)-sulfone; 2,4'-dihydroxydiphenyl sulfone; 5' - chloro-2,4'-dihydroxydiphenyl sulfone; 5'- chloro - 2',4 - dihydroxydiphenyl sulfone; 5'-chloro - 2',4 - dihydroxydiphenyl sulfone; 3'-chloro-4,4'-dihydroxydiphenyl sulfone; bis (4-hydroxy phenyl) biphenyl disulfone, etc. The preparation of these and other useful sulfones is described in Patent 2,288,282—Huissman. Polysulfones as well as substituted sulfones using halogen, nitrogen alkyl radicals, etc, are also useful. Dihydroxy aromatic ethers such as p,p'-dihydroxydiphenyl ether; the 4,3'-, 4,2'-, 3,3'-, 2,2'-, 2,3'- etc. dihydroxydiphenyl ethers;

4,4'-dihydroxy-2,6-dimethyldiphenyl ether;
4,4'-dihydroxy-2,5-dimethyldiphenyl ether;
4,4'-dihydroxy-3,3'-di-isobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxy-tetraphenyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such material are considered to be included. Preferably the dihydric phenol is a gem-bis-(hydroxyphenyl) alkane in which the central alkylidene radical contains from 1 to 6 carbon atoms.

The aryl dichloroformates suitably employed are those which correspond to the general formula

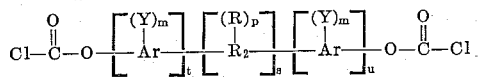

wherein Y, R, $R_2$, Ar, m, p, t, s, and u denote the same groups and numerical values as in Formula I above. Preferred dichloroformates are those of preferred dihydric phenols.

The metal catalyst suitably employed comprises the phenol salt of a metal selected from the group consisting of beryllium, magnesium, calcium, strontium, barium, and manganese. These phenates are readily prepared by reacting all of the phenols described hereinbefore with either the free metal or with an inorganic salt thereof such as the metal chloride, bromide, iodide, sulfate, nitrate, phosphate or silicate. In practice however, it is advantageous to form the phenate catalyst in situ by simply adding to the reaction system the free metal or inorganic metal salt.

By the term "phenate" is meant a salt of any of the above-specified metals and phenols in the same generic sense as applied to the phenol reactants. Preferably the phenol precursor of the phenate is the same as the phenol employed as a reactant, as is necessarily the case when the metal phenate is prepared in situ. However since the quantity of phenate catalyst required is quite small the phenate can be derived from a phenol different from the phenol reactant without appreciable contamination of the desired diaryl carbonate product.

Preferred phenates, whether preformed or prepared in situ are those of magnesium and manganese. When prepared in situ the preferred metal salts are magnesium chloride and manganese chloride.

Catalyst concentration values are not narrowly critical, but in general from about 50 to about 5000 millimoles of metal or metal compound per mole of dihydric phenol reactant provide adequate catalytic action. Preferably from about 50 to about 500 millimoles catalyst per mole of dihydric phenol reactant is employed.

In the aspect of the invention in which an aryl dichloroformate is used as the carbonate precursor, it is preferred to employ substantially equimolar quantities of dihydric phenol and aryl dichloroformate, i.e. the theoretical stoichiometric proportions. The reaction can be carried out in bulk, i.e. in the molten state in the absence of an inert solvent medium, or in the presence of such a solvent medium. The use of an inert solvent medium is preferred.

In the preferred form of the invention an equimolar amount of the bisphenol and of the dichloroformate is heated in an inert solvent in the presence of the catalyst. The process of the reaction may be followed by measuring the evolution of hydrogen chloride in the exit gases. When this evolution stops, the reaction is considered completed. The catalyst is then removed by simple filtration and the polycarbonate isolated either by coagulation in a solvent in which the polymer is insoluble or by simple evaporation of the initial solvent. In cases where the evolving hydrogen chloride may cause degradation of either the monomers or the polymer, it is advisable to work in a stream of nitrogen in order to remove the acid continuously from the reaction medium. Highest molecular weights are obtained when exactly equimolar amounts of reactants are taken. In cases where the stoichiometry is not exact, lower molecular weight polymers result. The amount of catalyst used and also the time and temperature of heating depend upon the particular reaction system. Optimum reaction conditions vary somewhat from catalyst to catalyst and from one pair of reactants to another. Catalysts derived from metals with high coordinative properties give somewhat slower rates, but generally provide higher conversion, purity and molecular weight. Temperatures of from about 70° C. to about 220° provide a generally useful range for normal operation.

In the process embodiment wherein the dihydric phenol is contacted with phosgene, the order of mixing of the reactants and the catalyst is not a critical factor. It is preferred however to first dissolve the dihydric phenol in an inert organic solvent therefor, and thereafter add to the solution the metal, metal salt, or diphenate catalyst followed by the phosgene.

Addition of phosgene is accomplished by any of the conventional techniques, i.e. it can be introduced into the reaction system in the form of a gas or in the form of a liquid, and can be added either in a plurality of small charges or all at once. Carrier inert gases and solvents can also be used if desired. For complete reaction, the stoichiometric proportions of dihydric phenol and phosgene are one mole phosgene for each mole of dihydric phenol. Advantageously quantities of phosgene in excess of the stoichiometric amount are to be avoided. The reaction is not dependent however upon a critical balance of reactants. Large excesses of either reactant can be tolerated provided economic factors and high product yield are not important considerations to the practitioner.

As in the aspect in which an aryl dichloroformate is used as the carbonate precursor, optimum temperatures for the process embodiment utilizing phosgene depend in large measure on the particular dihydric phenol employed, the thermal stability of the polymer product, the particular catalyst, and upon the presence or absence of an inert organic solvent and medium. In general in the absence of a solvent, temperatures of from about 155° C. to about 200° C. are suitable. When the reaction system includes an organic solvent medium, temperatures of from about 70° C. to about 200° C. are satisfactory.

In either of the process embodiments, i.e. using either phosgene or an aryl dichloroformate, suitable organic solvents include benzene, xylene, chlorobenzene, o-dichlorobenzene, carbon tetrachloride, chloroform, 1,2,4-trichloroethane, sym. tetrachloroethane, toluene, and the like.

obtained in a yield of 97.2%. Reduced viscosity value (0.2 gms. polymer/100 ml. methylene chloride solution at 25° C.) was 0.61.

EXAMPLES 2–6

The diphenate compounds of beryllium, strontium, barium, calcium, and manganese result from the reaction of beryllium sulfate, strontium nitrate, barium chloride, calcium phosphate, and manganous bromide respectively with bis (4-hydroxyphenyl) methane in a molar ratio of 2:1 in a reaction medium of chlorobenzene when the mixture is heated at reflux. The metal diphenate exists in equilibrium with the metal salt present. Normally solid polycarbonate polymers are prepared by contacting at reflux temperature for about 10 hours a dihydric phenol with a substantially equal molar quantity of phosgene in the presence of at least one of the aforesaid metal diphenates and an inert organic solvent medium, said metal diphenate being present in an amount corresponding to about 0.2 mole equivalents of the metal. The reaction formulations are set forth in Table I below:

TABLE I

| Ex. No. | Dihydric Phenol | Phenate Catalyst of Metal | Solvent Medium | Reaction Temperature, °C. | Polymer Product |
|---|---|---|---|---|---|
| 2 | HO—C₆H₄—SO₂—C₆H₄—OH | Be | Chlorobenzene | ~130 | [—O—C₆H₄—SO₂—C₆H₄—O—C(O)—]ₙ, n=>60 |
| 3 | HO—C₆H₃(Cl)—CH₂—C₆H₃(Cl)—OH | Sr | Tetrachloroethane | ~144 | [—O—C₆H₃(Cl)—CH₂—C₆H₃(Cl)—O—C(O)—]ₙ, n=>40 |
| 4 | HO—C₆H₄—C(CH₃)₂—C₆H₄—OH | Ba | o-Dichlorobenzene | ~180 | [—O—C₆H₄—C(CH₃)₂—C₆H₄—O—C(O)—]ₙ, n=>50 |
| 5 | HO—C₆H₂(C₂H₅)₂—CH(C₆H₅S)—C₆H₂(C₂H₅)₂—OH | Mn | Carbon tetrachloride | 76 | [—O—C₆H₂(C₂H₅)₂—CH(C₆H₅S)—C₆H₂(C₂H₅)₂—O—C(O)—]ₙ, n=>25 |
| 6 | HO—C₆H₄—CH₂—C₆H₄—OH | Ca | Chlorobenzene | ~130 | [—O—C₆H₄—CH₂—C₆H₄—O—C(O)—]ₙ, n=>40 |

The present invention is more fully illustrated by the following examples. It is to be understood that these examples are in no way intended to be limitative of the proper scope of the invention which is defined by the appended claims.

EXAMPLE 1

In a glass reactor equipped with a thermometer, stirring means, a gas inlet tube, and a reflux condenser, a mixture of 2.5 grams (~0.007 mole) of the dichloroformate of 2,2-bis(4-hydroxyphenyl) propane, 1.615 (~0.007 mol) of 2,2-bis(4-hydroxyphenyl)propane, 0.17 grams magnesium powder, and 25 ml. o-dichlorobenzene was heated at reflux in a stream of dry nitrogen for about 10 hours. Hydrogen chloride evolved rapidly from the reaction system during the first three hours of the reaction period, diminishing during the latter stages. No color developed in the polymer product. After cooling, the reaction mass was diluted with ~50 ml. methylene chloride and filtered through a celite bed prepared in chlorobenzene. The celite bed was then washed with an additional 50 ml. of methylene chloride and the combined filtrate was coagulated in approximately 10 times its volume of isopropanol. The polymer product was The polycarbonates prepared in accordance with the present invention are well known in the art and find extensive use in the manufacture of electrical insulators, packaging films, home appliance parts such as handles, knobs and the like.

What is claimed is:

1. The process for preparing polycarbonate resins which comprises heating at a temperature of between about 70° C.–220° C. which temperature is sufficient to cause the evolution of hydrogen chloride an anhydrous reaction mixture comprising as the sole reactants a dihydric phenol and a carbonate precursor selected from the group consisting of phosgene and a dichloroformate of a dihydric phenol and as the sole catalyst therefor, a catalytic amount of at least one metal salt of a dihydric phenol, the metal being selected from the group consisting of beryllium, magnesium, calcium, strontium, barium, and manganese and evolving said hydrogen chloride as a gas from said reaction mixture.

2. Process according to claim 1 wherein the carbonate precursor is phosgene.

3. Process according to claim 1 wherein the carbonate precursor is a dichloroformate of a dihydric phenol.

4. Process according to claim 1 wherein the dihydric phenol, metal salt and carbonate precursor is heated in an inert organic solvent medium.

5. Process according to claim 1 wherein the dihydric phenol and the carbonate precursor are present in substantially equimolar amounts.

6. Process according to claim 5 wherein the dihydric phenol is a gem-bis(4-hydroxyphenyl)alkane in which the connective alkylidene radical of said gem-bis(4-hydroxyphenyl)alkane contains from 1 to 6 carbon atoms.

7. Process according to claim 6 wherein the metal salt of a dihydric phenol is a salt of beryllium.

8. Process according to claim 6 wherein the metal salt of a dihydric phenol is a salt of calcium.

9. Process according to claim 6 wherein the metal salt of a dihydric phenol is a salt of magnesium.

10. Process according to claim 6 wherein the metal salt of a dihydric phenol is a salt of barium.

11. Process according to claim 6 wherein the metal salt of a dihydric phenol is a salt of manganese.

References Cited by the Examiner

UNITED STATES PATENTS

| | | | |
|---|---|---|---|
| 2,964,797 | 12/1960 | Peilstöcker | 260—47 X |
| 3,030,331 | 4/1962 | Goldberg | 260—47 X |
| 3,030,335 | 4/1962 | Goldberg | 260—47 X |
| 3,083,182 | 3/1963 | Matsukane | 260—47 X |
| 3,161,615 | 12/1964 | Goldberg | 260—47 X |
| 3,189,640 | 6/1965 | Dietrich et al. | 260—463 |
| 3,213,061 | 10/1965 | Caldwell et al. | 260—47 X |
| 3,220,976 | 11/1965 | Goldberg | 260—47 X |
| 3,223,677 | 12/1965 | Matzner | 260—47 X |

FOREIGN PATENTS

| | | |
|---|---|---|
| 870,096 | 6/1961 | Great Britain. |
| 1,198,715 | 6/1959 | France. |

WILLIAM H. SHORT, *Primary Examiner.*

LOUISE P. QUAST, *Examiner.*